Oct. 12, 1926.
C. M. LUCK
1,602,852
TRACTOR TRAILER
Filed June 8, 1925
3 Sheets-Sheet 1
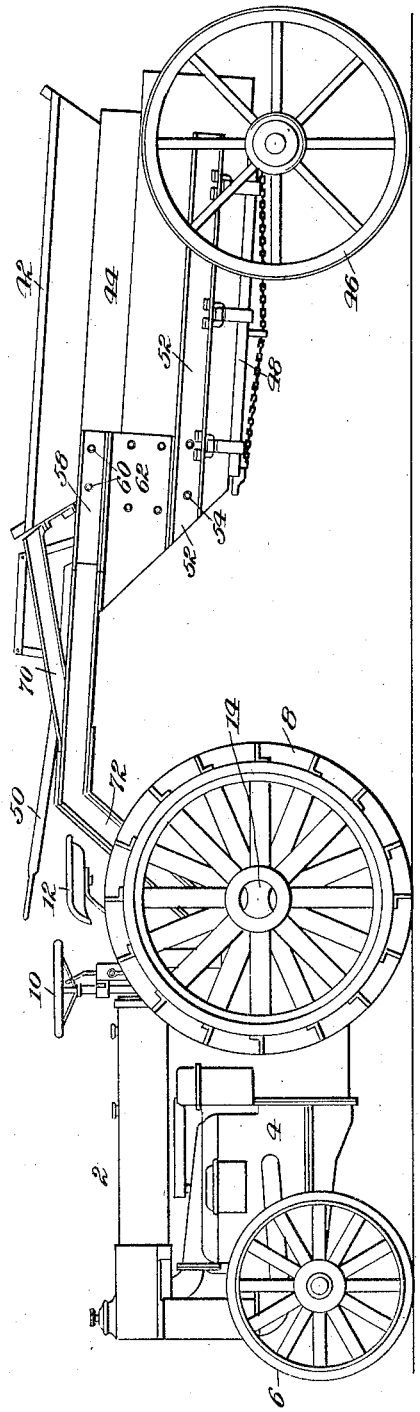
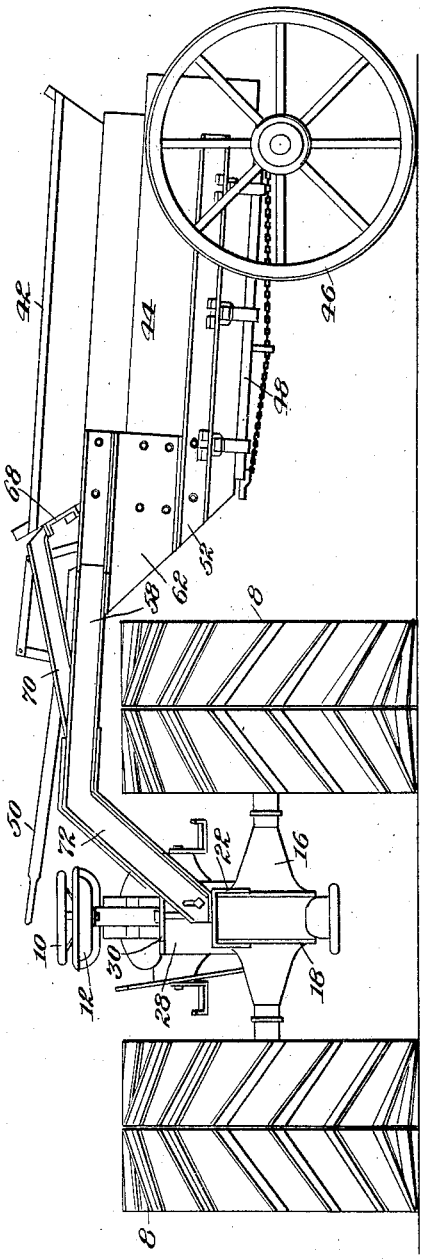
Inventor:
Charles M. Luck,
Atty's.

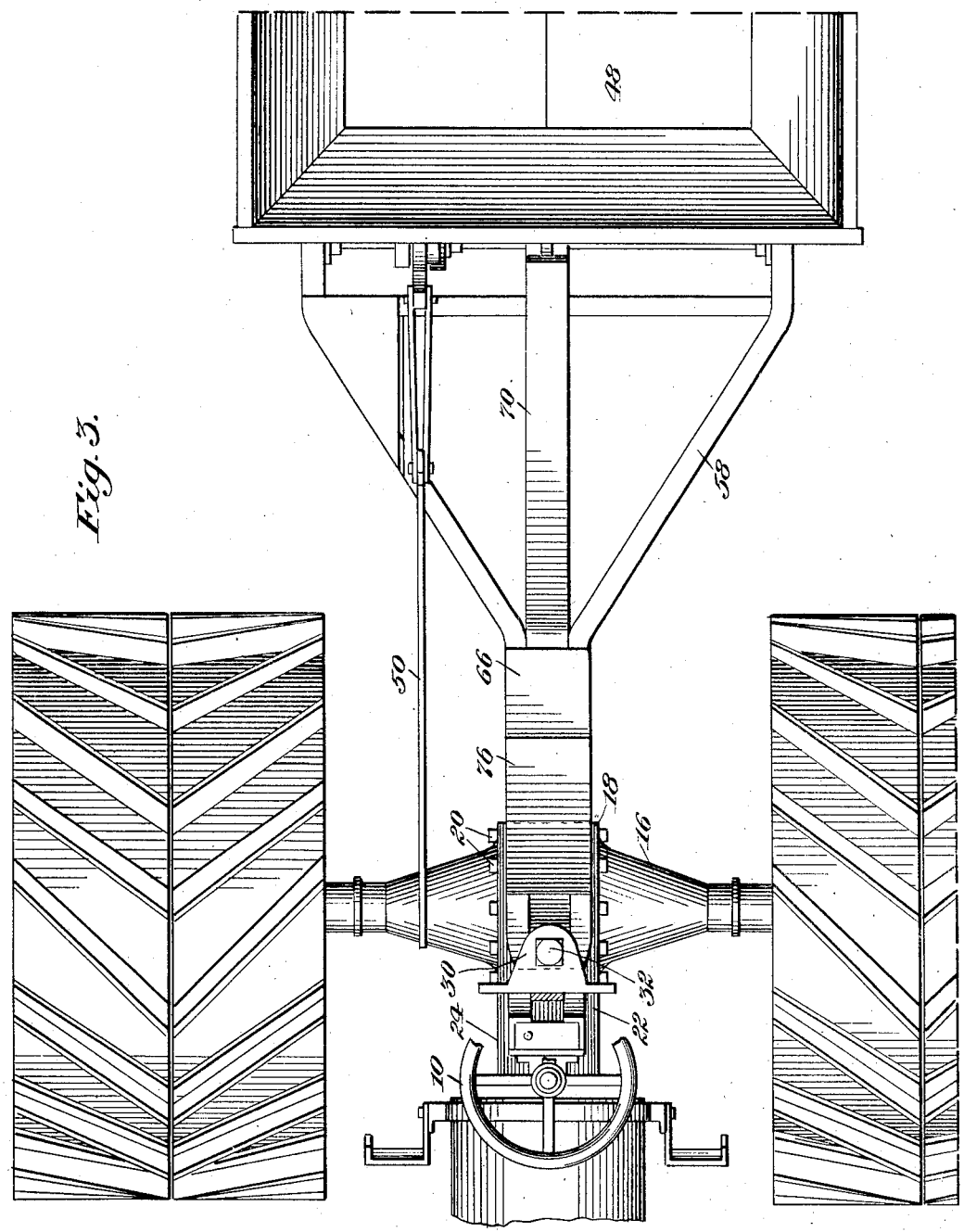

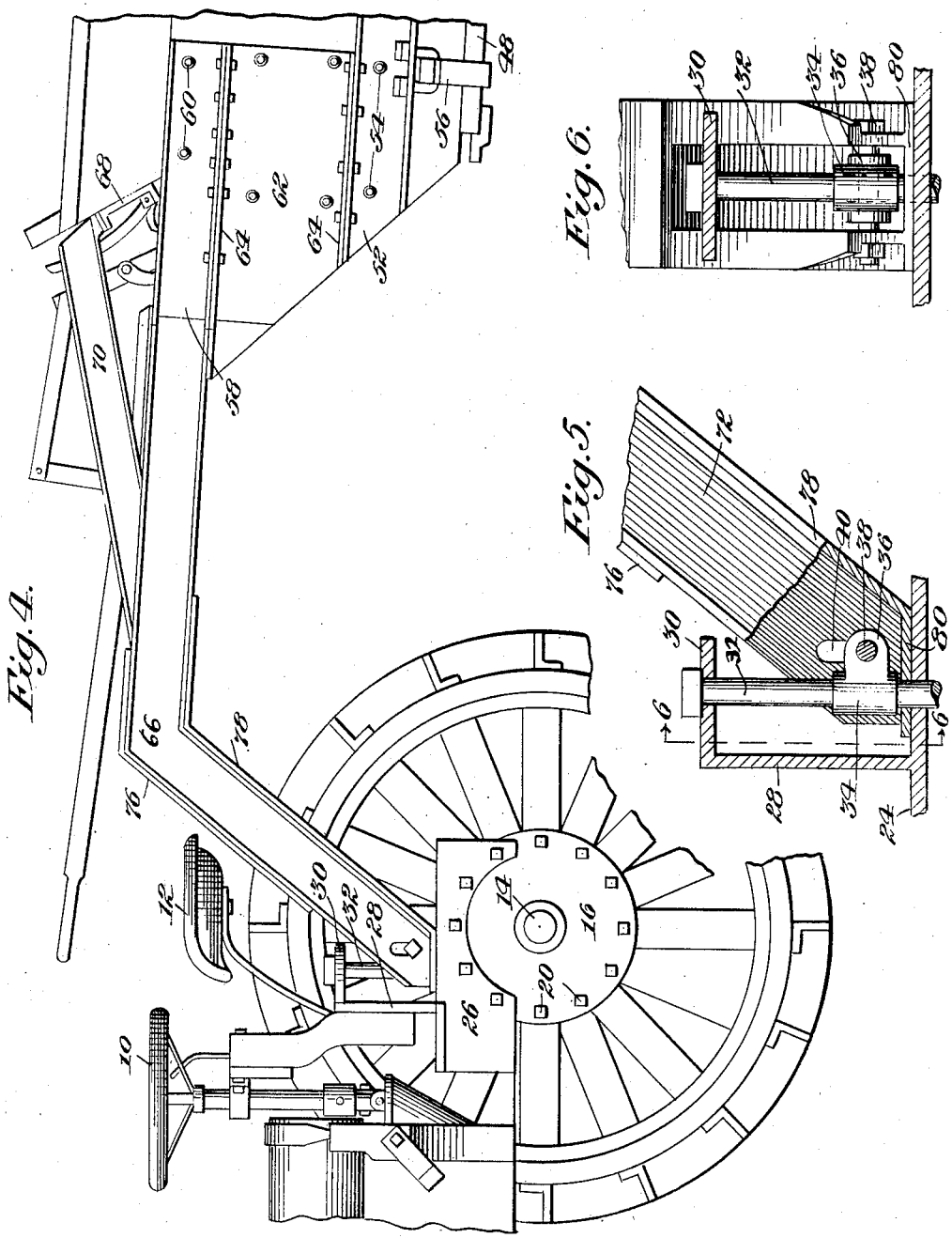

Patented Oct. 12, 1926.

1,602,852

UNITED STATES PATENT OFFICE.

CHARLES MERLE LUCK, OF RICHMOND, VIRGINIA.

TRACTOR TRAILER.

Application filed June 8, 1925. Serial No. 35,778.

This invention relates to motor vehicles and has particular reference to vehicles of the tractor-trailer type.

It has been proposed heretofore to adapt a tractor to road service by coupling it to a two-wheeled trailer. Such a transportation system, however, has been accompanied by certain practical disadvantages which decrease the efficiency in the use thereof. Foremost among these disadvantages is the tendency of the tractor to tilt backwards under a heavy load, thereby lifting the guide wheels completely off the roadbed and even in some instances turning the tractor over. This instability is due to the location of the connection between the trailer and tractor either over or rearwardly of the rear axle of the tractor, whereby the load is concentrated at the rear of the latter and not evenly distributed over the four wheels thereof. Another disadvantage of tractor-trailer vehicles heretofore used resides in the fact that insufficient clearance is provided between the tractor and trailer to permit a short turn, especially when the tractor is equipped with large wheels of the 24″ type. Still another disadvantage of the trailer itself has been due to structural defects in the framework of the trailer, such framework frequently lacking the necessary durability to withstand the constant strains and stresses to which it is subjected during heavy use.

A general object of this invention is to provide a vehicle of the tractor-trailer type having an improved construction in which the above mentioned disadvantages are eliminated.

A further object of the invention resides in connecting the trailer to the tractor in such a manner that the load will be distributed over all of the wheels of the tractor, the load itself being utilized to insure tractive engagement between the front wheels of the tractor and the ground.

A still further object of the invention consists in an improved trailer construction which affords ample clearance for the tractor to make a right angle turn, or greater, when necessary.

Another object of the invention is to provide a trailer which is simple in construction, inexpensive to manufacture, and durable in use.

These and other objects and features of the invention will appear more fully from the following detailed description when read in connection with the accompanying drawings and will be pointed out in the appended claims.

In the drawings:

Fig. 1 is a side elevation of a vehicle constructed in accordance with this invention;

Fig. 2 is a view similar to Fig. 1 with the tractor in position to make a right angle turn;

Fig. 3 is a broken plan view showing the connection between the tractor and trailer, parts being broken away;

Fig. 4 is a side elevation of the parts shown in Fig. 3, the left rear wheel of the tractor being removed;

Fig. 5 is an enlarged view partly in section of the connection between the tractor and trailer; and Fig. 6 is a vertical section taken on lines 6—6 of Fig. 5, looking in the direction of the arrows.

Referring more particularly to the drawing, the reference character 2 indicates generally a tractor having a body 4, front and guide wheels 6, rear or driving wheels 8, a steering wheel 10, and a driver's seat 12 in operative proximity to the steering wheel. The rear wheels are mounted upon an axle 14, which is enclosed in the usual axle housing 16. The axle housing consists of two tapered sections having at their larger ends flanges 18, which are fastened to the opposite sides of body 4 by a crown of bolts 20. A trailer supporting member or bridge 22 consisting of a top plate 24 and side plates 26 is secured to the flanges 18 of the axle housing, the connection being effected by a part of the bolts 20. The top face of the supporting member or bridge 22 is provided with an upstanding vertical plate or lug 28 having a rearwardly extending flange 30 upon the upper end thereof. The flange 30 and the bridge member 22 are formed with aligned openings for the reception of a vertically arranged king pin 32. Slidably mounted upon the king pin is a vertical sleeve 34 having formed integral therewith a horizontal sleeve 36. A coupling bolt 38 extends through the horizontal sleeve 36 and elongated slots 40 provided in the terminal 72 of the trailer frame. This construction affords in effect a simple and inexpensive universal joint between the tractor and trailer. In order to give stability to the tractor when the trailer is under heavy load, this invention contemplates the location of the joint just described as far in advance of the rear axle as possible. In this manner, the pressure of the load will not fall entirely upon the rear axle, but will be distributed upon both axles, the more advanced the joint, the more even the distribution.

In addition to serving as a bearing for the king pin, the flange 30 acts as a stop to limit the backward tilting of the tractor by engagement with the forward portion of the trailer frame. In this manner, any tendency on the part of the tractor to tilt backward will be arrested in time to eliminate the danger of overturning.

The reference character 42 indicates generally a trailer having a load receiving body 44 supported at the rear end by the wheels 46. The bottom of the trailer body is formed by the doors 48 pivoted to the sides of the body and adapted when released to drop in position to discharge the load. The operation of the doors is controlled through a hand lever 50 located in position to be readily accessible from the driver's seat.

The frame for supporting the trailer will now be described. A sturdy channel beam 52 is attached to each side of the body of the trailer adjacent the lower edge thereof, the said beam extending substantially the entire length of the trailer and being preferably secured in position by bolts 54. The beams 52 not only serve to brace the sides of the trailer, but also are utilized to support the bottom doors, the latter being pivotally connected to the beams by the straps 56. Channel beams 58, similar in construction to the beams 52, are attached to the sides of the trailer body by bolts 60, the beams 58 being located adjacent to the upper edge of the body and projecting a substantial distance beyond the front of the trailer to form a connection between the trailer and the tractor in a manner hereinafter described in detail. The rear ends of the beams 58 and the front ends of the beams 52 are rigidly connected by heavy plates 62, the said plates being formed with top and bottom flanges 64 which are welded or bolted to the bottom of the beams 58 and the top of the beams 52, respectively.

The beams 58 extend parallel to each other for a short distance in front of the trailer and there diverge toward a common point 66 located in the line of the longitudinal axis of the trailer. A heavy channel beam 68 (see Figure 4) extends along the front face of the trailer adjacent the upper edge thereof, the said beam being connected at each end to one of the side beams 58. It should be noted that the cross beam 68 is supported by the side beam to which it is attached and is entirely unconnected with the front face of the trailer. This construction eliminates the usual strain ordinarily placed upon the front of the trailer, which frequently results in the collapse of the entire front face thereof. An I-beam 70 is supported at its rear end upon the central portion of the upper face of the cross beam 68, the front end of the I-beam merging with the side beams 58 at the point 66 where these beams are permanently secured together by any suitable means, such as welding, to form a unitary structure. From the point 66, the beams are bent downwardly to produce the terminal portion 72, which is connected to the tractor in the manner previously described. In order to give additional strength to the frame at the bending point 66, the beams 58 and 70 are connected by top and bottom plates 76 and 78. The plate 78 extends to the front end of the frame, where it is bent to form a flat horizontal bearing surface 80 for engagement with the supporting member 22 of the tractor.

From an inspection of Figs. 1 and 2 it will be noted that the point 66, at which the frame beams merge, is located a considerable distance from the front of the trailer. This construction, combined with the location of the side beams 58 near the top of the trailer body at a height above the top of the rear wheels of the tractor permits the tractor to freely make a very sharp turn without any interference by the trailer or connecting frame. Fig. 2 illustrates the tractor in the position of a right angle turn, although an even shorter turn than that can be made if necessary.

Trailers constructed in accordance with this invention have proven exceedingly efficient and durable even when subjected to the most severe tests. There are no frail parts which are easily broken, thereby requiring the withdrawal of the trailer from service for repairs. The strain of the load is evenly distributed by the arrangement of the side beams over the entire trailer, so that there is no tendency on the part of the body to collapse under a heavy load. The length of the connecting beams 58 and the arrangement thereof above the wheels of the tractor permits the tractor to make the shortest possible turn. The location of the king pin 32 forwardly of the rear axle of the tractor gives stability to the vehicle by distributing the load upon all of the wheels of the tractor. When, under extreme conditions, the tractor does tilt backward, the engagement between the flange 30 and the terminal 72 of the trailer frame arrests the tilting action before the turning over point is reached.

Having described the invention, what I claim as new and desire to secure by Letters Patent of the United States is:

1. A vehicle of the class described having in combination, a tractor having a rear driving axle, a casing for said axle, a bridge member detachably connected to said casing and extending forwardly therefrom, a trailer having a rectilinear frame terminating in a downwardly inclined portion, means for connecting said inclined portion of the frame to the said bridge and means on said tractor and extending rearwardly therefrom to engage said inclined portion of the frame to arrest the rearward tilting of the tractor.

2. A vehicle of the class described having in combination, a tractor having a rear driving axle, a casing for said axle, a bridge member detachably connected to the intermediate portion of said casing, a trailer, a frame for supporting said trailer, means for connecting the trailer frame to the upper portion of said bridge member, and a rigid projection on said tractor normally spaced from the trailer and adapted to move into engagement with the frame of said trailer and limit the rearward tilting of the tractor.

3. A vehicle of the class described having in combination, a tractor having a rear driving axle, a casing for said axle, a bridge member detachably connected at the intermediate portion of said casing, said bridge member extending forwardly from the casing, a vertical lug secured to the upper face of the bridge adjacent the front edge thereof, a rearwardly extending flange formed at the upper end of said lug, said flange and bridge being provided with aligned openings, a king pin adapted to extend through said openings, said pin being arranged in advance of the rear axle of the tractor, a trailer frame for supporting said trailer, and a coupling member including said king pin for connecting the forward end of the trailer frame to the tractor.

4. A vehicle of the class described having in combination, a trailer consisting of a body portion adapted to support a load, wheels for supporting the rear end of said trailer, a trailer frame, said frame comprising a horizontally extending channel beam secured to each side of the body adjacent the lower end thereof, an upper channel beam secured to each side of the body adjacent the upper edge thereof and projecting a substantial distance beyond the front face of the body and substantially parallel to the upper edge thereof, said upper beams being inclined downwardly at their forward ends to form a terminal for connection with a tractor.

5. A vehicle of the class described, having in combination, a trailer consisting of a body portion, wheels for supporting the rear end of said body portion, a trailer frame, said frame consisting of a channel beam secured to each side of the body adjacent the lower edge thereof, and extending substantially the entire length of the body, an upper channel beam secured to each side of the body adjacent the upper edge thereof and projecting beyond the front face of the body a substantial distance, means for connecting the rear end of the upper channel beams to the front end of the lower channel beams, the said upper channel beams diverging toward each other and secured together at a point lying in the vertical plane of the longitudinal axis of the body, the said beams being inclined downwardly at the point of union to form a terminal adapted to be connected to a tractor.

6. A vehicle of the class described, having in combination, a trailer including a body, wheels for supporting the rear end of the body, a trailer frame including a beam secured to each side of the body adjacent the upper edge thereof and projecting beyond the front face of the body, the said beams diverging toward each other and being united at a point located a substantial distance in front of the tractor, a cross beam secured to the said side beams adjacent to the front face of the tractor, an additional supporting beam extending from the cross beam to the point at which the side beams merge, the said side beams being inclined downwardly from the point of connection to form a terminal adapted to be coupled to the tractor.

7. A vehicle of the class described comprising a trailer having a body portion, wheels for supporting the rear end of the body portion, a trailer frame, said frame including a beam secured to each side of the body along the lower edge thereof and extending substantially the entire length of the body, an upper beam secured to the upper portion of each side of the body and projecting a substantial distance beyond the front face thereof, means for connecting the upper and lower beams together, the said upper beams extending parallel for a short distance in front of the body and then diverging to unite at a point a considerable distance in front of the body, said beams being inclined downwardly from the point of union to form a terminal adapted to be connected to a tractor.

8. A vehicle of the class described, comprising a trailer having a body portion, wheels for supporting the rear end of the trailer, a trailer frame comprising beams secured to each side of the body adjacent the lower edge thereof and extending substantially the entire length of the body, an upper beam secured to each side of the body adjacent the upper edge thereof and projecting beyond the front face of said body, means for connecting the upper and lower beams together, said upper beams diverging toward each other and united at a point a substantial distance in advance of the front face of the body, a cross bar connected to the side beams adjacent to the front face of the body, a longitudinal beam supported at its rear end by the transverse beam and being united to the side beams at their point of union, the said frame being inclined downwardly adjacent the point of connection of the side beams to form a terminal adapted to be connected to a trailer, and means for reinforcing the frame at the point of inclination.

9. A vehicle of the class described, having in combination, a tractor having a rear driving axle, a casing for said axle, a bridge member detachably connected to the intermediate portion of said casing, a trailer including a body, wheels for supporting the rear portion of the body, a trailer frame, said frame including beams secured to the sides of the body adjacent the upper edge thereof, said beams extending parallel for a short distance in front of the body and then diverging to meet at a point a considerable distance in advance of the front face of the body, a transverse beam secured to the side beams adjacent to the front face of the trailer, a longitudinal beam supported at its rear end upon the transverse beam and connected with said beams at their point of merger, said frame being inclined downwardly to form a connecting terminal, and means for connecting said terminal to the upper face of said bridge at a point in advance of the rear axle of the tractor.

10. A vehicle of the class described having in combination, a tractor having a rear driving axle, a casing for said axle, a bridge member detachably connected to the intermediate portion of said casing, a vertical lug secured to the upper face of the bridge adjacent the front end thereof, a rearwardly extending flange formed at the upper end of said lug, the said flange and bridge being provided with aligned openings, a coupling pin adapted to extend through said openings, a trailer having a body, a frame for supporting said body, the said frame comprising a horizontally extending channel beam secured to each side of the body adjacent the lower edge thereof and extending substantially the length of the body, an upper channel beam secured to each side of the body adjacent the upper edge thereof and projecting beyond the front face of the body, a plate connecting the rear end of the upper channel beam to the forward end of the lower channel beam, the said upper beams extending parallel to each other for a short distance in front of the trailer, and then diverging to a common point located a substantial distance in advance of the trailer, a transversely extending beam having its opposite ends connected to one of the upper beams, the said transverse beam being adjacent to, but unconnected with, the front face of the body, an additional supporting beam secured at its rear end to the transverse beam and extending forwardly between the upper side beams, the side beams and the additional supporting beam being rigidly connected at the point of merger, the said frame being inclined downwardly at the point of merger of said beams to form a terminal for connecting the trailer frame with the tractor, the end of the terminal being adapted to bear upon the tractor bridge at a point in advance of the rear axle and being rigidly coupled to the tractor by said king pin.

11. A vehicle of the class described having in combination a tractor having a rear driving axle, a casing for said axle, a bridge member connected to said casing, a trailer having a frame terminating in a downwardly inclined portion, and means on said tractor and extending rearwardly therefrom to engage the inclined portion of the frame to arrest the rearward tilting of the tractor.

12. A vehicle of the class described having in combination a tractor having a rear driving axle, a casing for said axle, a bridge member connected at the intermediate portion of said casing, said bridge member extending forwardly from the casing, a trailer, means for connecting the trailer frame to the bridge member, a lug on said bridge member, and a rearwardly extending flange formed on said lug, said flange being adapted to engage the frame of the trailer to limit the rearward tilting of the tractor.

13. A vehicle of the class described having in combination a trailer consisting of a body portion adapted to support a load, and a trailer frame, said frame comprising a horizontally extending channel beam secured to each side of the body adjacent the upper edge thereof and projecting a substantial distance beyond the front face of the body and substantially parallel to the upper edge of the latter, said beams being inclined downwardly at their forward ends to form a terminal for connection with a tractor.

In testimony whereof I set my signature.

CHARLES MERLE LUCK.